3,629,174
HEAT-STABILIZED AND LIGHTFAST POLYAMIDES
Francesco Siclari, Cesano Maderno, Pierluigi Perazzoni, Palazzolo Milanese, and Pier Giorgio Silvestroni, Cesano Maderno, Italy, assignors to Snia Viscosa Società Nationale Industria Applicazioni S.p.A., Milan, Italy
No Drawing. Filed Feb. 25, 1970, Ser. No. 14,245
Claims priority, application Italy, Mar. 6, 1969, 13,744/69
Int. Cl. C08g *51/26, 51/58, 51/62*
U.S. Cl. 260—29.1 R                8 Claims

ABSTRACT OF THE DISCLOSURE

In the manufacture of polyamides for industrial uses in general, such as for the production of fibers, yarns, moulded articles and the like, the improvement is herein disclosed, which consists in the concurrent addition of a stabilizing copper compound and of an allyl halide, in which the hydrogen atom of the double-bonded methylene grouping is possibly substituted by an aliphatic radical. Allyl chloride has proven to be the most advantageous in its class. Very surprisingly, the presence of an allyl chloride as defined above has exhibited an unpredictable activity in neutralizing the discolouration which would be otherwise experienced should the copper compound be used alone. Products having an outstandingly high whiteness rating have been thus obtained.

---

This invention relates to the production of polyamides or polyamide copolymers which have been stabilized against the action of heat and light, having a high whiteness rating, or colorless optical features.

The production of such polyamides (or co-polyamides) has important applications in several industrial fields, especially in the field of fibres and plastics materials.

In the fibre field, glossy (transparent) yarns are required, to be used as a material for tire cords, fishing nets and the like; alternatively, mat or substantially white yarns are required for the manufacture of belts, curtains, fabrics for interior decoration and the like.

In all of these cases, it is desirable that the yarns, in addition to possessing satisfactory optical characteristics, be also endowed with a high resistance to heat, oxidation and light.

The long-lasting exposure of said yarns both to the action of heat (such as can occur, for example, when employing the yarn in tire cords, in which a considerable heat build-up is experienced, as is well known), the heat being conducive to detrimental oxidising actions on the yarn, and to the action of light (yarns for interior decoration, curtains and the like) originates in the yarns concerned a considerable detrimental action which deteriorates the physical and mechanical characteristics (such as tensile strength, etc.) for which the fibres are, conversely, so highly appreciated.

Also in the yarns used for clothing (such as shirts or other articles) it is desired that substantially white yarns may be obtained, having a satisfactory resistance when exposed to light. In the plastics material applications it is desired, in some instances, that polyamides have a satisfactory resistance to light, heat and be substantially colorless or white.

Among the expedients which are known in the art in order that the above recalled detrimental actions on the fibres may be overcome, it is known to add certain substances to the starting materials for the production of polyamides, or their addition in the intermediate stages of their manufacture.

In this field, the use of amines for hindering or toning down the detrimental action of heat is known (antioxidants) and the use of copper compounds (see for example the German patent spec. No. 883,644) is also known in order to impart to the yarn a satisfactory resistance both to heat and the degrading action of light.

The copper-compound containing additives are generally preferred to the others on account of their twofold protective action both against heat and light.

These known additives, which have been improved by the technical art long since, are often effective in causing a fibre to retain to a high degree its physico-mechanical properties, but originate other troubles: more exactly, they tend to impart to the end products more or less dark discolorations, which are far from desirable, as outlined above.

In order that the considerable pink or red staining, caused by the copper compounds, very presumably due to precipitation of elemental copper during polymerization or the subsequent melting of the chips, may be overcome, it has been sugegsted to use, concurrently with the copper compounds aforementioned, several halogen-containing compounds.

For example, the Canadian patent spec. No. 550,298 has suggested the combined use of copper salts and alkali metal or alkaline earth metal halides.

The British patent spec. No. 1,060,710 suggests the use of aliphatic or alicyclic hydrocarbons, substituted only with iodine, concurrently with copper compounds.

In all of the above cases, while a good resistance to light and heat is achieved, the polymers thus obtained and the yarns produced thereby do not exhibit any more the desirable whiteness rating or absence of staining (glossy polymer) which are essential in the manufacture of the textile products specified above.

The copper salts according to the known art can be either organic salts, such as acetates, tartrates, oxalates, or inorganic salts, such as chlorides, sulphates, iodides, bromide, etc., both in the form of cupric and cuprous salts. This wide salt spectrum shows that the favourable action is due to the copper ion, irrespective of its associated anion.

It has been surprisingly ascertained that, in the field of additives or stabilizers based on aliphatic hydrocarbons, positively improved results over the prior art are obtained if allyl halides are used, in which the hydrogen atom of the double-bonded methylene grouping is possibly substituted by an aliphatic radical. The inventive halides have shown an unpredictable higher activity in neutralizing the above mentioned detrimental discolouring action of the copper ion.

More particularly, according to this invention, the use of allyl chloride has proven to be practicable and advantageous in order that the best qualitative results in the produced polyamide may be obtained.

The presence of the additives according to the invention permits obtaining polymers having a very white colour and a high resistance to heat and light. The invention permits, by overcoming the undersirable side-effects of copper, adding copper salts also in an amount which would not be permissible without the incorporation of an anti-precipitating agent. Copper can be added either in the form of an organic or inorganic salt selected from those listed in the foregoing, and also in other forms. Preferably, for solubility and economic reasons, it can be employed as an acetate or a halide. It is advisable that the copper salt is employed in such an amount as to have, in the polymer, from 10 to 500 parts per million (p.p.m.) of copper, and preferably from 30 to 150 p.p.m., these amounts being generally adapted to impart to the polymer, in coaction with allyl halide, the heat and light-resistance properties which are most commonly appreciated. The allyl halide should be employed in an amount which is a function of the amount of copper whose detrimental discolouring action is to be prevented, and, in general, in an amount ranging from 0.5% to 0.005%, on a weight basis, of the employed monomer, and, still more preferably, in a proportional amount ranging from 0.200% to 0.020%.

This suggestion as to the amount of allyl halide holds good also in the case that reference is had to the polymer.

The additive which is characteristic for this invention can be associated to small amounts of other substances in order to adjust transparency, crystallization phenomena, plastic properties of the polymer, etc.

The latter substances comprise the known additives as used in the polyamide field, such as titanium dioxide and other matting agents (when white or mat products are desired) and the conventional viscosity stabilizing and chain-ending agents such as acetic and phosphoric acid and the sulphonic acids such as benzene sulphonic and naphthalene sulphonic acid, for example.

In addition, plasticizers can be added, which are adapted to facilitate the extrusion of the polymer through a die and through the spinneret orifices, such as hydrocarbons, stearates, palmitates, etc., or small amounts of substances adapted to improve the fibre transparency so as to enable the fibres to be employed in those applications such as fishing nets, in which the transparency of the polyamide is a requirement.

Typical expedients to improve the polymer transparency are the addition of hydrohalogenic acids HF, HBr, HI, HCl and their alkali metal salts or of ethylene chlorohydrin, or the addition of small amounts of another monomer so as to disturb crystallization. According to an advantageous feature of the invention, whenever it is desired to obtain a semi-transparent fibre, this can be obtained by merely increasing the proportional amount of the allyl halide, even without any addition of matting agents. In this case, the preferred amounts range in the field of the higher values among those outlined above, and more particularly above 0.15%.

Polymers which contain amounts of allyl halide which are under 0.04% are transparent, in addition to being clear. Such a transparency is exalted by adding from 0.010% to 0.060% of hydriodic or hydrochloric acid, or of ethylene chlorohydrin.

A few examples of practical embodiments of the invention are now given in tabular form, in conjunction with the necessary examples for comparison and for evidencing the relative advantages, obtained under different conditions.

EXAMPLE 1

In order to check the advantageous effects of the use of allyl halide, a set of production run tests have been made with different polyamides (nylon 11, nylon 66, nylon MXD-6, nylon 12 and nylon 6) under conditions of absolute parity in the proportions of copper and allyl halide. To this purpose, a stainless steel autoclave has been charged, for each test, with 10 kgs. of monomer, 15 gms. allyl chloride and 2.5 gms. cupric acetate. Each test has been repeated, under identical conditions, without any addition of allyl halide, so as to institute a comparison. Obviously, the polymerization conditions have been adapted, for each group of tests and corresponding comparisons, to the different requirements of the respective monomers. These conditions are reported on Table I-A. The results of these tests are tabulated in Table I-B.

It can be observed, in the latter table, that, in all the cases in which the allyl halide was used, the polymer in its molten condition was colourless and the product, in chip form, was white, whereas, when no halide was used, a sharp and intense discolouration was observed. The chips were remelted under nitrogen blanket for 30 mins. at 290° C., the colour being then checked.

The table also indicates the viscosity values. For the polymers obtained in the tests 1 to 4, these values have been indicated in terms of intrinsic viscosity at 20° C. in metacresol (0.5 gms. of polymer in 100 mls. of solution), calculated according to the formula:

$$\eta_{oih} = \frac{2.3 \log_{10} \eta_r}{c}$$

wherein $c$ is the concentration in grams of polymer per 100 mls. of solution, whereas for the tests 5 and 5 bis, the viscosity has been indicated in terms of relative viscosity, as measured in the manner to be explained in the following example.

EXAMPLE 2

On account of the similar behaviour of the different polyamide polymers, caprolactam has been selected as the starting monomer for another set of tests in which different types of allyl halides and copper salts have been introduced, with or without other additives. Since these tests were intended to show the different influences due to the nature and/or the proportions of the additives, the same polymerization conditions have been adopted throughout, as follows:

In an aluminum block with electrical heating means and having specially provided wells, glass test tubes for polymerization have been introduced. In each test tube 100 gms. of caprolactam, 3 gms. of epsilon-aminocaproic acid and 3 gms. water have been introduced, whereafter the copper salts and the allyl chloride have been added, as described in Table II. Upon scavenging with a nitrogen stream, the assembly is heated during one hour at 240° C. and during three additional hours to 265° C. Subsequently, vacuum is applied, and a residual pressure of 250 mms. of mercury is attained during 3 hours.

Upon cooling, the polymer is ground, washed, dried and subjected to analysis for determining the relative viscosity (as measured at 20° C.) in solution in conc. sulphuric acid which contain 1 gm. of polymer per 100 mls. of acid. The washed chips are remelted in a nitrogen atmosphere for 30 minutes at 290° C. to check the stability of the white colour. The results are tabulated in Table II.

The tests show that copper imparts a red staining (test No. 2) when it is not associated to the allyl halide (test No. 1). When the halogen is not bound in an allyl compound, it is less efficient (test No. 3).

The other tests show that it is possible to use, besides the chloride, also iodides and bromides of allyl (also substituted), both alone and combined together.

EXAMPLE 3

A new set of tests has been carried out by maintaining the nature and the amount of the copper compound and the allyl halide constant (the comparison tests being obviously excluded), with and without the addition of other additives, in order to determine in a clearer manner the influence of said other additives, the other conditions being all the same. The procedure was as follows:

A 20-liter stainless steel autoclave has been charged with 10 kgms. caprolactam, 400 mls. water, 2.2 gms. cupric chloride, allyl chloride and the other possible additives. In a few comparison tests the allyl halide is dispensed with, and possibly also the copper salt. Upon scavenging with a nitrogen stream, the autoclave is brought to 260° C. and 4 atmospheres during 4 hours. The vessel is slowly vented to ambient pressure and vacuum is applied, reaching a residual pressure of 250 mms. of mercury during 4 hours. The polymer is extruded in chip form, washed for 24 hours in boiling water, dried during 24 hours at 100° C. under a mechanical pump vacuum. The relative viscosity is determined on the chip as in Example 2. The polymers are subsequently spun according to the conventional methods and drawn on a hot plate at 160° C. so as to obtain a filament of 100/20 deniers. The fibers have been treated at 200° C. in air oven during two hours, to determine heat resistance. Light fastness has been tested after exposure to light during 100 and 200 hours in a "Fade-Ometer" device, manufactured by Atlas Electric Devices Corp. of Chicago, according to the A.S.T.M specification D 506. The results of the tests are collected in Table III.

Table III shows that the tests Nos. 1, 3 and 4, which contain an allyl halide, have viscosities which are adapted to the manufacture of polyamide tire cord, a white colour of the yarns and very satisfactory characteristics of light and heat resistance. Test No. 2, even though it shows good characteristics of heat and light resistance, has a red staining; test No. 5 is heat resistant to a high degree, but is of a dark colour and has no lightfastness, whereas test No. 6, even though showing a satisfactory whiteness rating is neither lightfast nor heat-resistant. Test No. 7, with iodoform, has good characteristics of light resistance and heat resistance but has a colour which is sharply different from white.

EXAMPLE 4

In order to determine the effect of the addition of allyl chloride concurrently with other different additives and with copper salts of a different nature and in different amounts, further tests have been performed, whose results are shown in Table IV. As can be seen, the combination of allyl halides with different pigments, chain-stabilizers, and also hydrohalogenic acids and their salts, has always produced a white product, whereas the comparison tests 2 bis and 4 bis, in which no allyl halide was employed, were conducive to the display of a sharp pink staining.

EXAMPLE 5

The advantageous effect of the addition of an allyl halide, to the ends and according to the method of this invention, has also been confirmed in the case of moulded component parts and articles of polyamide resins. To this end a further set of tests has been performed, as follows.

Three polycaproamides have been prepared according to the procedure of Example 3. They have been moulded so as to obtain test samples for plastics, as specified in the tests for determining tensile strength and elongation at break according to the method A.S.T.M. D 638–58T. The samples were 1.2 mm. thick. Tensile and elongation tests have been performed on the samples as such and after 48 hours and 192 hours of stay in an air oven at 160° C.

Table V shows that the stabilized polyamide has a resistance which is much higher than that of the polyamide devoid of additives, the efficiency of the allyl additives being thus evidenced, according to the invention, also when they are used in the production of plastics materials.

(Tables I–A, I–B, II, III, IV, V follows.)

TABLE I-A

| Monomer | Water, grams | Stage performed under pressure | | | Stage with venting and vacuum | | |
|---|---|---|---|---|---|---|---|
| | | Time, hours | Temperature, °C. | Pressure, atm. | Time, hours | Temperature, °C. | Pressure, mm. Hg |
| Omega aminoundecanoic acid | 500 | 3 | 265 | 5 | 4 | 265 | 250 |
| Hexamethylenediamine adipate | 1,000 | 5 | 280 | 3 | 4 | 280 | 25 |
| Metaxylylenediamine adipate | 500 | 5 | 265 | 5 | 5 | 265 | 250 |
| Lauroyl lactam | 500 | 7 | 290 | 10 | 15 | 290 | 760 |

TABLE I-B

| | | Substances loaded in the autoclave | | | | | Color of the polymer | | |
|---|---|---|---|---|---|---|---|---|---|
| Test Number | Monomer | Distilled water, grams | Allyl chloride, percent of monomer | Copper, p.p.m. | Polymer | Intrinsic viscosity in meta-cresol | Molten polymer | Molten chip | Remelted chip |
| 1 | Omega-aminoundecanoic acid | 500 | 0.15 | 80 | Nylon-11 | 1.68 | Colorless | White | White. |
| 1 bis | do | 500 | 0 | 80 | do | 1.67 | Dark red | Red | Dark red. |
| 2 | Hexamethylene diamine adipate | 1,000 | 0.15 | 80 | Nylon 6-6 | 1.05 | Colorless | White | White. |
| 2 bis | do | 1,000 | 0 | 80 | do | 1.08 | Red | Violet-blue | Red. |
| 3 | Metaxylylenediamine adipate | 500 | 0.15 | 80 | (¹) | 1.05 | Colorless | White | White. |
| 3 bis | do | 500 | 0 | 80 | do¹ | 1.35 | Dark red | Red | Dark red. |
| 4 | Lauroyl lactam | 500 | 0.15 | 80 | Nylon 12 | 0.96 | Colorless | White | White. |
| 4 bis | do | 500 | 0 | 80 | do | 1.21 | Red | Violet | Red. |
| 5 | Caprolactam | 500 | 0.15 | 80 | Nylon 6 | 3.1 | Colorless | White | White. |
| 5 bis | do | 500 | 0 | 80 | do | 3.2 | Red | Red | Red. |

¹ Metaxylylenediamine polyadipate (MXD6).

TABLE II

| Test No. | Allyl compound Grams, percent | Allyl compound Formula and name | Copper salt Grams | Copper salt P.p.m. | Other additives— Chain stabilizers, pigments, co-monomers and others Name | Other additives— Chain stabilizers, pigments, co-monomers and others | Relative viscosity of washed chips in $H_2SO_4$ | Color of the polymer Molten | Color of the polymer Solid | After re-melting |
|---|---|---|---|---|---|---|---|---|---|---|
| 1 | 0.15 | Allyl chloride | 0.030 | 100 | Acetate | Acetic acid, gms. 0.060 | 2.90 | Colorless | White | White. |
| 2 | 0 | | 0.030 | 100 | do | do | 3.05 | Red | Red | Red. |
| 3 | 0.15 | {$CH_3$—CH=CH—Cl / 1-chloroprene} | 0.030 | 100 | do | do | 3.02 | Red | Red | Red. |
| 4 | 0.24 | {$CH_2$=CH—$CH_2$—I / Allyl iodide} | 0.026 | 100 | Cupric chloride | | 3.16 | Colorless | White | White. |
| 5 | 0.075 / 0.12 | Allyl chloride / Allyl iodide | 0.026 | 100 | do | | 3.10 | do | do | Do. |
| 6 | 0.04 / 0.06 | Allyl chloride / Allyl iodide | 0.026 | 100 | do | | 3.20 | do | do | Do. |
| 7 | 0.15 | {$CH_2$=CH—$CH_2$—Cl / Allyl chloride} | 0.016 | 80 | Phosphate | Acetic acid, gms. 0.015 | 4.77 | do | do | Do. |
| 8 | 0.15 | Same as above | 0.022 | 80 | Cupric chloride | Acetic acid, gms. 0.060 | 2.95 | do | do | Do. |
| 9 | 0.15 | do | 0.017 | 60 | do | Phosphoric acid (52%) gms. 0.188 (=0.098%). | 3.84 | do | do | Do. |
| 10 | 0.15 | do | 0.045 | 160 | do | 80%-1-5-naphthalene-disulphonic acid gms 0.36 (=0.29%). | 2.68 | do | do | Do. |
| 11 | 0.30 | {$CH_3$—CH=CH—$CH_2$Br / 1-bromo 2-butene} | 0.030 | 100 | Acetate | Acetic acid, gms. 0.060 | 2.85 | do | do | Do. |
| 12 | 0.30 | {$CH_2$=CH—$CH_2$Br / 3-bromopropene} | 0.030 | 100 | do | do | 2.88 | do | do | Do. |

TABLE III

| Test No. | Substances loaded in the autoclave Copper, p.p.m. | Substances loaded in the autoclave Allyl, gms. | Substances loaded in the autoclave Chloride, percent of the monomer | Substances loaded in the autoclave Other additives | Relative viscosity in $H_2SO_4$ on washed chips | Color of the polymer Washed chips | Color of the polymer Filament | Lightfastness [1] 100 h. | Lightfastness [1] 200 h. | Heat resistance [2] Reel | Heat resistance [2] Lea |
|---|---|---|---|---|---|---|---|---|---|---|---|
| 1 | 80 | 15 | 0.15 | | 3.21 | White | White | 92 | 84 | 97 | 90 |
| 2 | 80 | 0 | 0 | | 3.39 | Pink | Red | 85 | 75 | 95 | 80 |
| 3 | 80 | 2.0 | 0.02 | {Hydriodic acid, gms. 2(=0.02%) / Acetic acid, gms. 2(=0.02%)} | 3.34 | White | White | 100 | 97 | 100 | 94 |
| 4 | 80 | 4.0 | 0.04 | {Hydriodic acid, gms. 4(=0.04%) / Acetic acid, gms. 2(=0.02%)} | 3.25 | do | do | 98 | 90 | 100 | 96 |
| 5 | 0 | 0 | 0 | Flexamina (Naugatuck), gms. 100 (=1%). | 3.30 | Brown | Dark yellow | 35 | | 95 | 83 |
| 6 | 0 | 0 | 0 | Acetic acid, gms. 6 (=0.03%) | 3.20 | White | White | 52 | 25 | 25 | 30 |
| 7 | 80 | 0 | 0 | Iodoform, gms. 18 (=0.180%) | 3.21 | Yellow | Pale yellow | 91 | 85 | 96 | 89 |

[1] Fadeometer exposure, percent of retained tensile.
[2] In hot air oven at 200° C. during two hours, percent of retained tensile.

TABLE IV

| Test No. | Substances loaded in the polymerization autoclave Allyl chloride Percent of monomer | Substances loaded in the polymerization autoclave Allyl chloride Gms. | Substances loaded in the polymerization autoclave Copper p.p.m. | Substances loaded in the polymerization autoclave Copper Gms. | Substances loaded in the polymerization autoclave Copper salt | Other additives: chain stabilizers, comonomer, pigments, plasticizers, etc. | Relative visc. in $H_2SO_4$ on washed chips | Color of the polymer Washed chip | Color of the polymer Washed, dried and remelted at 300° C. | Color of the polymer Filament |
|---|---|---|---|---|---|---|---|---|---|---|
| 1 | 50 | 0.500 | 500 | 15.8 | Acetate | | 2.78 | White | White | White. |
| 2 | 15 | 0.150 | 10 | 1.0 | Stearate | Acetic acid, gms. 6 (=0.06%) | 3.10 | do | do | Do. |
| 2 bis | 0 | 0 | 10 | 1.0 | do | do | 3.12 | Pink | Pink | Pink. |
| 3 | 4 | 0.040 | 10 | 0.3 | Cupric chloride | Titanium dioxide, gms. 50 (=0.5%). | 3.28 | Matt-white | Matt-white | Matt-white. |
| 4 | 15 | 0.150 | 80 | 2.2 | do | do | 3.18 | do | do | Do. |
| 4 bis | 0 | 0 | 80 | 2.2 | do | do | 3.20 | Pink | Pink | Pink. |
| 5 | 2 | 0.020 | 150 | 4.2 | do | {Acetic acid, gms. 12 (=0.120%) / Hydrochloric acid, gms. 4 (=0.04%) / Hydrobromic acid, gms. 4 (=0.04%) / Sodium fluoride, gms. 8 (=0.04% HF).} | 2.70 | White | White | White. |
| 6 | 15 | 0.150 | 30 | 0.9 | Cupric acetate | Hexamethylenediamine acetate, gms. 1,100 (=10%). | 3.18 | do | do | Do. |
| 7 | 15 | 0.150 | 10 | 0.3 | do | {Omega aminoundecanoic acid, gms. 1,100 (=10%). / p-Toluenesulphonic acid, gms. 19 (=0.190%).} | 2.94 | do | do | Do. |

TABLE V

| Test No. | Copper P.p.m. | Copper Gms. | Copper Copper salt | Substances added to the monomer | Relative viscosity in $H_2SO_4$ washed chip | Color of the polymer | Exposure in hot air oven at 160° C. Retained tensile strength, percent 48 hours | Exposure in hot air oven at 160° C. Retained tensile strength, percent 192 hours | Exposure in hot air oven at 160° C. Retained elong. at break, percent 48 hours | Exposure in hot air oven at 160° C. Retained elong. at break, percent 192 hours |
|---|---|---|---|---|---|---|---|---|---|---|
| 1 | 80 | 2.2 | Cupric chloride | {Gms. 15 allyl chloride (=0.150%) / Gms. 200 benzenesulphonebutylamide (Plastomoll Trademark) (=2%)} | 2.93 | White | 97 | 71 | 92 | 68 |
| 2 | 0 | 0 | Nil | Acetic acid, gms. 6 | 2.90 | do | 50 | 41 | 7 | 3 |
| 3 | 80 | 2.2 | Cupric chloride | {Gms. 5 allyl chloride (=0.050%) / Gms. 5 allyl bromide (=0.050%) / Gms. 5 allyl iodide (=0.050%)} | 3.05 | do | 98 | 75 | 94 | 72 |

What is claimed is:

1. A polyamide composition, which is stabilized against degradation by oxidation, heat and light and having a high whiteness rating, having incorporated therein stabilizing amounts of a copper compound and an allyl halide selected from the group consisting of allyl chloride, allyl bromide, allyl iodide, and derivatives of allyl chloride, bromide and iodide compounds in which the double-bonded methylene hydrogen is substituted by a methyl radical.

2. A polyamide composition as claimed in claim 1, wherein the copper compound is in an amount between 10 and 500 parts per million as expressed in elemental copper, and the allyl halide is an amount which is between 0.005% and 0.5% by weight of the composition.

3. A polyamide composition as claimed in claim 2, wherein the copper compound is in an amount between 10 and 150 p.p.m. and the allyl halide is in an amount between 0.02% and 0.2% by weight of the composition.

4. A polyamide composition as claimed in claim 3, wherein the allyl halide is present in an amount less than 0.04% by weight of the composition and the composition is substantially colorless and transparent.

5. A polyamide composition as claimed in claim 3, wherein the allyl halide is present in an amount more than 0.15% by weight of the composition, and the composition is semi-transparent and matted.

6. A polyamide composition as claimed in claim 1, wherein there is also added a compound selected from the group consisting of hydrohalogenic acids and ethylene chlorohydrin in an amount between 0.01% and 0.06% by weight of the composition.

7. A polyamide composition as claimed in claim 1, wherein the allyl halide is allyl chloride.

8. A polyamide composition as claimed in claim 1, which also contains a plasticizer to make the composition usable for plastic products.

References Cited
UNITED STATES PATENTS

| | | | |
|---|---|---|---|
| 3,340,227 | 9/1967 | Krieger | 260—45.7 |
| 3,527,731 | 9/1970 | Champ | 260—45.75 |

DONALD E. CZAJA, Primary Examiner

V. P. HOKE, Assistant Examiner

U.S. Cl. X.R.

260—31.2 N; 33.6 R, 37 N, 45.7 R, 45.75 C